United States Patent Office 3,669,596
Patented June 13, 1972

3,669,596
APPARATUS FOR HOT RUNNER INJECTION MOULDING
Anthony James Savory, Handsworth Wood, England, assignor to Joseph Lucas (Industries) Limited, Birmingham, England
Filed Dec. 14, 1970, Ser. No. 97,968
Claims priority, application Great Britain, Dec. 9, 1969, 59,936/69
Int. Cl. B29c 1/00
U.S. Cl. 425—192
8 Claims

ABSTRACT OF THE DISCLOSURE

Apparatus for hot runner injection moulding comprises a fixed die part and a movable die part, the fixed die part and the movable die part defining therebetween a die cavity. An injection nozzle is carried by the fixed die part and a hot runner box having therein a passage communicating with the bore in the injection nozzle so that in use molten synthetic resin flows from a reservoir through the passage and the bore in the injection nozzle into the die cavity. Further the apparatus includes releasable latch means movable between first and second operative positions, such that in the first operative position the latch means secures the fixed die part to the hot runner box and in the second operative position the latch means secures the fixed die part to the movable die part so that the hot runner box can be removed without disturbing the fixed die part.

---

This invention relates to the apparatus for hot runner injection moulding.

Apparatus, according to the invention, comprising a fixed die part, a movable die part, said fixed die part and said movable die part defining therebetween a die cavity, an injection nozzle carried by said fixed die part, a hot runner box having therein a passage communicating with the bore in said injection nozzle such that in use molten synthetic resin flows from a reservoir through said passage and the bore in said injection nozzle into said cavity and releasable latch means movable between first and second operative positions, the arrangement being such that in said operative position said latch means secures said fixed die part to the hot runner box and in said second operative position said latch means secures the fixed die part to the movable die part so that the hot runner box can be removed without disturbing the fixed die part.

In the accompanying drawings.

Figure 1:
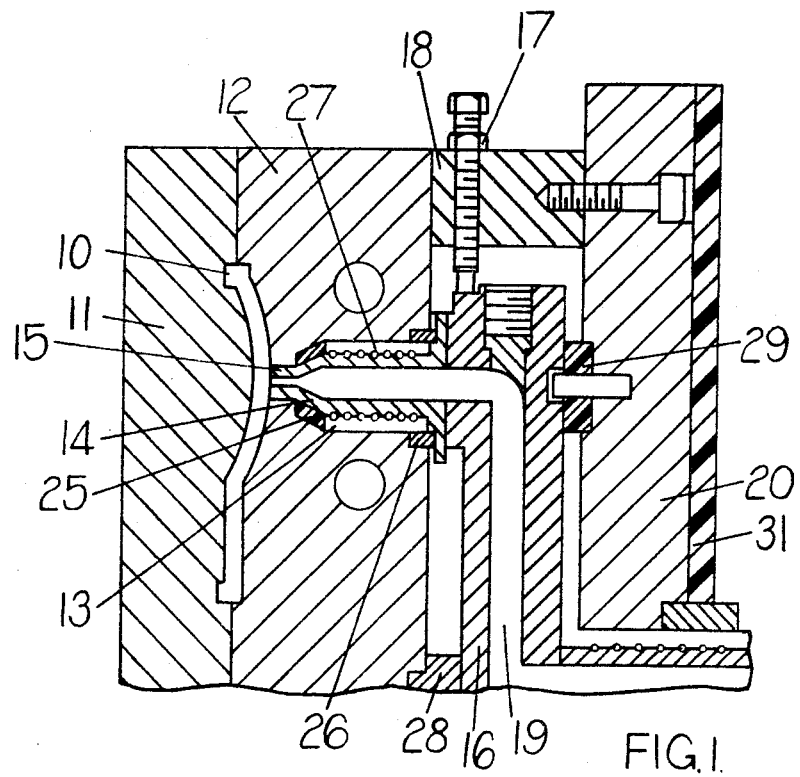
FIG. 1 is a sectional view of apparatus for hot runner injection moulding in accordance with one example of the invention.

Referring to the drawings, the apparatus includes a movable die part 11 and a fixed die part 12, defining therebetween a die cavity 10.

Positioned within an aperture in the fixed die part 12 is an injection nozzle 13. The nozzle 13 has an outlet 14 at one end thereof and the outlet 14 is formed with an axially extending portion 15 communicates with the die cavity 10. In use, a hot runner box 16 is secured adjacent the fixed die part 12 by a retaining screw 17, the screw 17 being engaged in screw threaded aperture in a spacing member 18. The hot runner box 16 has a passage 19 therein which communicates with the bore in the nozzle 13 so that molten synthetic resin can flow from a reservoir (not shown) through the passage 19, the bore in the nozzle 13, the outlet 14, and the axially extending portion 15 into the die cavity 10. The spacing member 18 is bolted to a back plate 20 and extends between the back plate 20 and the die part 12. The hot runner box 16 is mounted on the back plate 20 which is in turn secured to a conventional machine (not shown) supplying molten resin from the reservoir to the passage 19.

Figure 2:
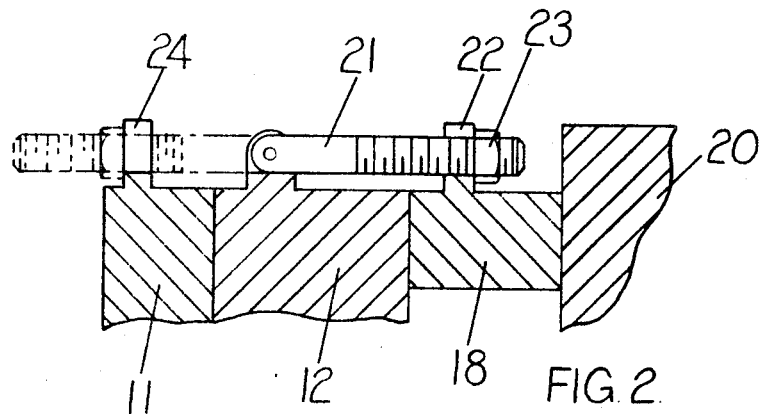
FIG. 2 is a sectional view of part of the apparatus shown in FIG. 1.

Pivotally mounted on outside surface of the fixed die part (as shown in FIG. 2) is a bolt 21 defining releasable latch means movable between first and second operative positions. In said first operative position the free end of the bolt 21 is received in a U-shaped groove in an upwardly projecting spigot 22 integral with the spacing member 18. A nut 23 is in screw-threaded engagement with said free end of the bolt 21 and urges the bolt into engagement with the spigot 22 whereby the hot runner box 16 is secured in contact with the nozzle 13 in said first operative position. On releasing the nut 23, the bolt can be moved angularly from said first operative position towards said second operative position. In the second operative position the free end of the bolt 21 is received in a U-shaped groove in an upwardly projecting spigot 24 integral with the movable die part 11, the nut 23 being again tightened so as to urge the bolt 21 into engagement with the spigot 24 whereby the fixed die part 12 is secured to the movable die part 11. In this position, when the retaining screw 17 has been retracted, the plate 20 and box 16 can readily be separated as a unit from the part 12 so as to permit easy inspection and cleaning of the injection nozzle.

It is to be appreciated that it is important in injection moulding apparatus that heat losses from the molten synthetic material should be reduced to a minimum. Therefore, as shown in FIG. 1, insulation is provided between parts of the apparatus which are in contact with one another and through which in use conduction of heat can occur. The insulation is preferably in the form of a pressed asbestos material sold under the trade name Sindanyo. An insulating sleeve 25 is provided round the outlet 14 of the injection moulding nozzle 13 and a flange 26 provides insulation between the end of the nozzle 13 remote from the outlet 14 and the fixed part 12. The rest of the injection moulding nozzle 13 is heated by a coil 27 to prevent heat losses as the molten resin passes through the nozzle. Further the hot runner box 16 is insulated from the fixed die part 12 and the back plate 20 by insulating stops 28, 29 respectively and a sheet 31 of Sindanyo provided insulation between the back plate 20 and the injection moulding machine.

Having thus described my invention what I claim as new and desire to secure by Letters Patent is:

1. Apparatus for hot runner injection moulding comprising a fixed die part, a movable die part, said fixed die part and said movable die part defining therebetween a die cavity, an injection nozzle carried by said fixed die part, a hot runner box having therein a passage communicating with the bore in said injection nozzle such that in use molten synthetic resin flows from a reservoir through said passage and the bore in said injection nozzle into said die cavity, first engagement means mounted on the movable platen, second engagement means mounted on the hot runner box and releasable latch means movable between first and second operative positions for alternatively engaging the first or second engagement means to secure the fixed platen to the movable platen or to the hot runner box so that the hot runner box can be removed without disturbing the fixed die part.

2. Apparatus as claimed in claim 1 wherein said latch means is pivotally mounted on said fixed die part for movement between said first and second operative positions.

3. Apparatus as claimed in claim 2 wherein said releasable latch means includes a bolt pivotally mounted at one end on the fixed die part and receiving a nut at its free end.

4. Apparatus as claimed in claim 3 wherein said hot runner box is mounted on a back plate and a spacing member is positioned between the back plate and the fixed die part, said bolt being urged by said nut into engagement with a further spigot integral with the movable die part in said second operative position.

5. Apparatus as claimed in claim 1 wherein insulating material is provided between the parts of the apparatus which are in contact with one another and through which, in use, conduction of heat can occur.

6. Apparatus as claimed in claim 5 wherein the insulating material is pressed asbestos.

7. Apparatus as claimed in claim 5 wherein the insulating material is Sindanyo.

8. Apparatus as claimed in claim 1 wherein a heater is provided for supplying heat to said injection nozzle, in use, so as to prevent loss of heat from the molten synthetic resin as the resin flows through the nozzle.

References Cited
UNITED STATES PATENTS

| | | | |
|---|---|---|---|
| 2,494,777 | 1/1950 | Patterson et al. | 18—42 D |
| 2,871,517 | 2/1959 | Allard | 18—30 R P |
| 3,021,568 | 2/1962 | Scott | 18—42 D X |
| 3,196,483 | 7/1965 | Ehyles | 18—42 D X |

J. SPENCER OVERHOLSER, Primary Examiner

M. O. SUTTON, Assistant Examiner

U.S. Cl. X.R.

425—247